(12) United States Patent
Ikegaya et al.

(10) Patent No.: US 6,305,746 B1
(45) Date of Patent: Oct. 23, 2001

(54) SEAT SLIDING APPARATUS

(75) Inventors: Isao Ikegaya; Yoshihiro Kanda; Tadashi Matsumoto, all of Kosai (JP)

(73) Assignee: Fujikiko Kabushiki Kaisha (JP)

( * ) Notice: Subject to any disclaimer, the term of this patent is extended or adjusted under 35 U.S.C. 154(b) by 0 days.

(21) Appl. No.: 09/566,575

(22) Filed: May 8, 2000

(30) Foreign Application Priority Data

May 11, 1999 (JP) ................................................ 11-130379

(51) Int. Cl.[7] ...................................................... B60N 2/06
(52) U.S. Cl. ........................ 297/344.1; 297/473; 248/429
(58) Field of Search ................................ 297/344.1, 473, 297/479, 472, 470, 216.1, 216.18; 248/429, 430

(56) References Cited

U.S. PATENT DOCUMENTS

| | | | |
|---|---|---|---|
| 4,209,159 | * 6/1980 | Becker et al. | 297/344.1 |
| 4,262,963 | * 4/1981 | Bauer et al. | 297/473 |
| 4,964,608 | 10/1990 | Rogala . | |
| 5,775,662 | * 7/1998 | Hoshihara et al. | 248/429 |
| 5,882,074 | * 3/1999 | Kojima | 297/344.1 |
| 6,098,946 | * 8/2000 | Sechet et al. | 248/430 |

FOREIGN PATENT DOCUMENTS

| | | |
|---|---|---|
| 0 751 029 | 1/1997 | (EP) . |
| 0 943 484 | 9/1999 | (EP) . |
| 2 221 245 | 1/1990 | (GB) . |

* cited by examiner

*Primary Examiner*—Anthony D. Barfield
(74) *Attorney, Agent, or Firm*—Kilpatrick Stockton LLLP

(57) ABSTRACT

A seat sliding apparatus includes: a pair of right and left lower rails (20, 20) each having lock teeth (22, 22); a first and a second upper rails (30A, 30B); first and second lock plates (40A, 40B); lock springs (50, 50) provided at the first and second upper rails (30A, 30B) respectively; and an operation lever (70) attached to the first and second lock plates (40A, 40B). In the above construction, a first end portion (70a) of the operation lever (70) is attached to the neighborhood of the pivot portion (41) of the first lock plate (40A). Furthermore, an operation lever attachment member (45) for attaching a second end portion (70b) of the operation lever (70) to the neighborhood of the pivot portion (41) of the second lockplate (40B) is provided to be rotatable and freely up and down.

3 Claims, 17 Drawing Sheets

SEAT SLIDING APPARATUS

BACKGROUND OF THE INVENTION

1. Field of the Invention

The present invention relates to a seat sliding apparatus for sliding a vehicle seat which seat body can be longitudinally moved and particularly relates to an attachment structure for attaching an operation lever to a lock plate.

2. Description of the Related Art

In a seat sliding apparatus of this type, the neighborhoods of the bases of lock plates are rotatably, pivotally attached to the side surfaces of a pair of right and left upper rails fixed to a seat cushion side, respectively. The both end portions of a U-shaped rigid operation lever are fitted into two attachment holes formed at the front side of each of the paired lock plates, respectively.

The respective lock plates simultaneously rotate by operating the operation lever. Lock holes formed at the free end sides of the respective lock plates are engaged with lock teeth formed on a pair of right and left lower rails fixed to a vehicle body, thereby preventing a seat main body from moving in longitudinal direction. In addition, by releasing the engagement of the lock holes with the lock teeth, the seat main body can be moved.

The above-stated conventional technique, however, has the following disadvantages. In the conventional seat sliding apparatus in which the both ends of the operation lever are fixedly attached to the respective lock plates, when a stress acts on the upper rail at the side at which a belt anchor is attached due to a collision or the like, the lock plate at the belt anchor attachment side together with the upper rail at the belt anchor attachment side is pulled upward, followed by the deformation of the floor of the vehicle body.

As a result, the rear end sides of the upper rail and lower rail at the belt anchor attachment side float and the upper and the lower rail are thereby inclined. Here, the upper rail at the other side, i.e., the side at which the belt anchor is not attached, is not applied with a force in floating direction and is not, therefore, inclined. In addition, the lock plates pivotally supported by the respective upper rails are coupled to each other by the U-shaped operation lever. Thanks to this, even when the upper rail at the belt anchor attachment side is inclined, the lock plate therefor is held in an initial state. That is, at the belt anchor attachment side, the lock plate is in the same state as that in which the lock plate rotates in unlocking direction with respect to the lower rail.

At the time of the collision, since a force is applied toward the front side, the lock holes of the lock plates are strongly engaged with the lock teeth of the lower rails, respectively and the locking state is not released, whereby the operation lever is bent and elastically deformed.

After collision, when no more force is applied toward the front direction, the lock plate at the belt anchor attachment side rotates in the unlocking direction only by the operation lever bending amount. As a result, the engagement of the lock holes with the lock teeth may be released to thereby release the locking state.

SUMMARY OF THE INVENTION

The present invention has been made to solve the above-stated disadvantages. It is, therefore, an object of the present invention to provide a seat sliding apparatus which can prevent releasing a locking state even when a stress acts on an upper rail at a belt anchor attachment side due to a collision or the like.

To achieve the object, according to a first aspect of the present invention, there is provided a seat sliding apparatus, comprising: a pair of right and left lower rails (20, 20) each having lock teeth (22, 22) formed thereon; a first and a second upper rails (30A, 30B) being arranged as a pair of right and left upper rails, the first and second upper rails (30A, 30B) being slidably mounted to the pair of right and left lower rails (20, 20) respectively, the first upper rail (30A) positioned at a seat belt anchorage plate attachment side, the second upper rail (30B) positioned opposite to the seat belt anchorage plate attachment side; first and second lock plates (40A, 40B) wherein portions of bases of the lock plates (40A, 40B) rotatably provided on side surfaces of the first and second upper rails (30A, 30B) by pivot portions (41, 41) respectively, lock holes (42a, 42a) engaged with the lock teeth (22, 22) formed on the pair of right and left lower rails (20, 20) being formed on free ends of the first and second lock plates (40A, 40B) respectively; lock springs (50, 50) provided at the first and second upper rails (30A, 30B) respectively, urging forces of the lock spring (50, 50) causing the lock holes (42a, 42a) to be engaged with the lock teeth (22, 22) respectively, the engagement of the lock holes with the lock teeth preventing a longitudinal movement of a seat main body (60) to be provided on the first and second upper rails (30A, 30B); and an operation lever (70) attached to the first and second lock plates (40A, 40B), the first and second lock plates (40A, 40B) simultaneously rotated and the engagement of the lock holes (42a, 42a) with the lock teeth (22, 22) released by operating the operation lever (70), the release of the engagement permitting the longitudinal movement of the seat main body (60), wherein the first end portion (70a) of the operation lever (70) is attached to a portion of the pivot portion (41) of the first lock plate (40A); and an operation lever attachment member (45) for attaching a second end portion (70b) of the operation lever (70) to a portion of the pivot portion (41) of the second lock plate (40B) is provided to be rotatable and freely up and down.

In the invention according to the first aspect constituted as stated above, when an abnormal stress acts on the first upper rail (30A) at the belt anchor attachment side due to a collision or the like, the end portion (70b) of the operation lever (70) attached to the operation lever attachment member (45) of the second lock plate (40B) arranged at the second upper rail (30B) at the belt anchor non-attachment side can be moved following the end portion (70a) of the operation lever (70) attached to the first lock plate (40A) arranged at the first upper rail (30A) at the belt anchor attachment side since the end portion (70b) is rotatably attached to the second lock plate (40B) at the belt anchor non-attachment side through the operation lever attachment member (45).

Thus, the above-stated stress acting on the first upper rail (30A) at the belt anchor attachment side does not transmitted to the second lock plate (40B) at the belt anchor non-attachment side and the operation lever (70) is not twisted. Consequently, it is possible to prevent release of the locking state of the belt anchor side.

According to a second aspect of the present invention, as it depends from the first aspect, the operation lever attachment member (45) is urged in the same direction as a direction in which the second lock plate (40B) rotates so as to release the engagement of the lock holes (42a, 42a) with the lock teeth (22, 22); and by being urged, the operation lever attachment member (45) to abut on the lock plate (40B).

Furthermore, according to the invention in the second aspect, the operation lever attachment member (45) to which the belt anchor attachment-side end portion (70b) of the operation lever (70) is attached, is normally press-contacted with the second lock plate (40B) at the belt anchor non-attachment side. Due to this, the operation of the operation lever (70) allows the first lock plate (40A) at the belt anchor attachment side and the second lock plate (40B) at the belt anchor non-attachment side to be rotated simultaneously.

Moreover, since the pivot shaft of the operation lever attachment member (45) for the operation lever (70) is provided at the lock plate (40B), it is possible to eliminate the loss of an operational force even when an additional member is provided between the operation lever (70) and the lock plate.

According to a third aspect of the present invention, as it depends from the first aspect, the operation lever (70) is formed into U-shape.

Therefore, operations of sliding the seat sliding apparatus is achieved by one hand of occupants, thereby facilitating the operations of sliding the seat sliding apparatus.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
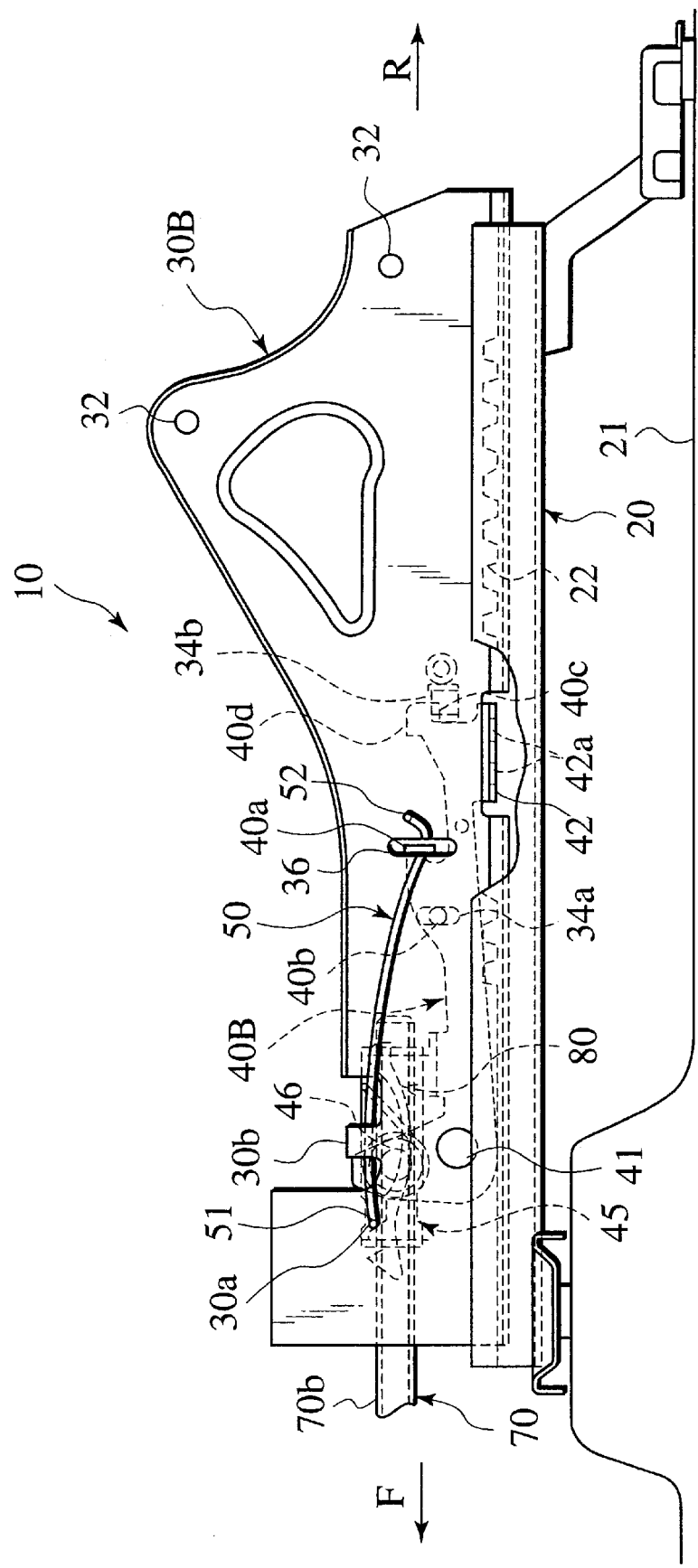
FIG. 1 is an explanatory front view of the belt anchor non-attachment side of a seat sliding apparatus in one embodiment according to the present invention.

There will be detailed below the preferred embodiments of the present invention with reference to the accompanying drawings, FIGS. 1 to 20. Like members are designated by like reference characters.

In the drawings, reference symbol 10 denotes a seat sliding apparatus for a vehicle seat. In this apparatus, portions of the bases of lock plates 40A and 40B are rotatably, pivotally attached to the side surfaces of a pair of right and left upper rails, that is, an upper rail 30A at a belt anchor attachment side and an upper rail 30B at a belt non-attachment side, respectively. The lock holes 42a of lock portions 42 formed on free end-side lower portions are engaged with the lock teeth 22 of a pair of right and left lower rails 20, 20 by the urging forces of lock springs 50, respectively, thereby making it possible to prevent the longitudinal movement of a seat main body 60. By releasing the engagement state, it is possible to longitudinally move the seat main body 60. The respective lock plates 40A and 40B are operable by the operation of a generally U-shaped operation lever 70 attached to the lock plates 40A and 40B.

Out of the lock plates 40A and 40B arranged at the upper rail 30A at the belt anchor attachment side and the upper rail 30B at the belt non-attachment side, respectively, an operation lever attachment member 45 is pivotally attached to be freely up and down, to a portion of the pivotal attachment portion 41 at which the lock plate 40B is pivotally attached to the upper rail 30B at the belt anchor non-attachment side. The both end portions 70a and 70b of the operation lever 70 are coupled with the lock plate 40A at the belt anchor attachment side and the operation lever attachment member 45, respectively.

The constitution of the embodiment according to the present invention will be described in detail.

Figure 16:
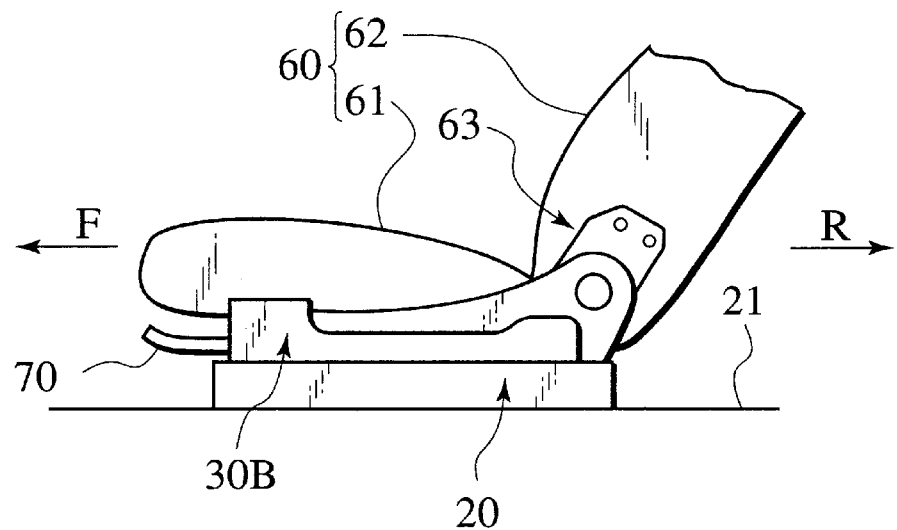
FIG. 16 is an explanatory front view schematically showing a seat main body.
Figure 17:
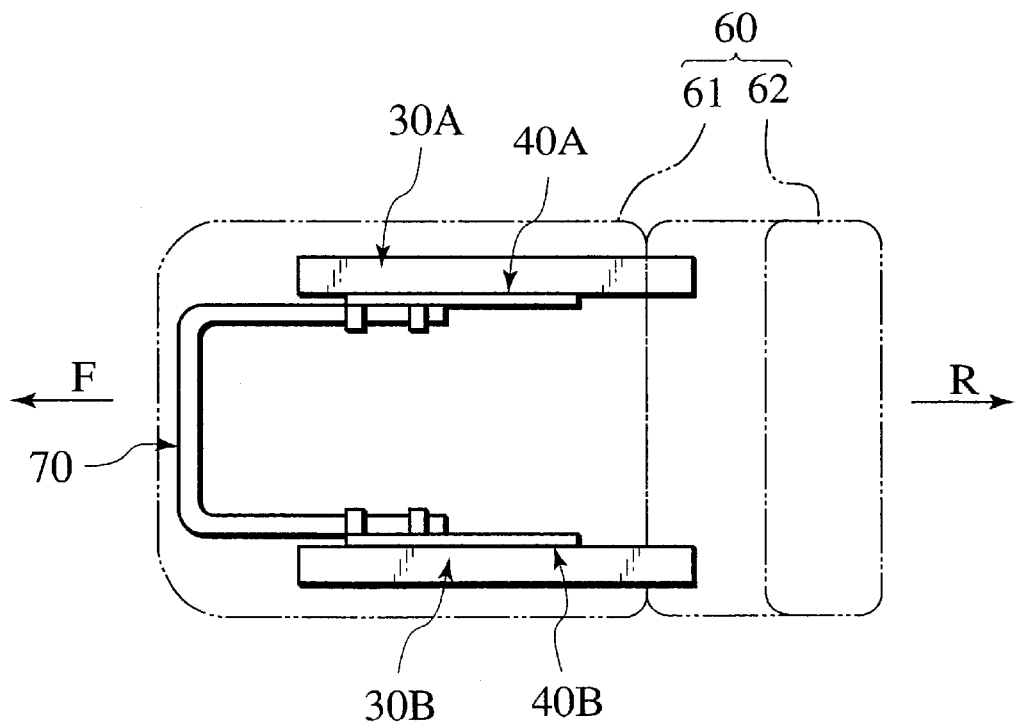
FIG. 17 is an explanatory plan view schematically showing a state in which the operation lever is attached to the lock plate.

As shown in FIGS. 16 and 17, the seat main body 60 includes a seat cushion 61 and a seat back 62. The seat back 62 is rotatably, pivotally attached to the rear portion of the seat cushion 61 by a seat reclining apparatus 63.

Figure 2:
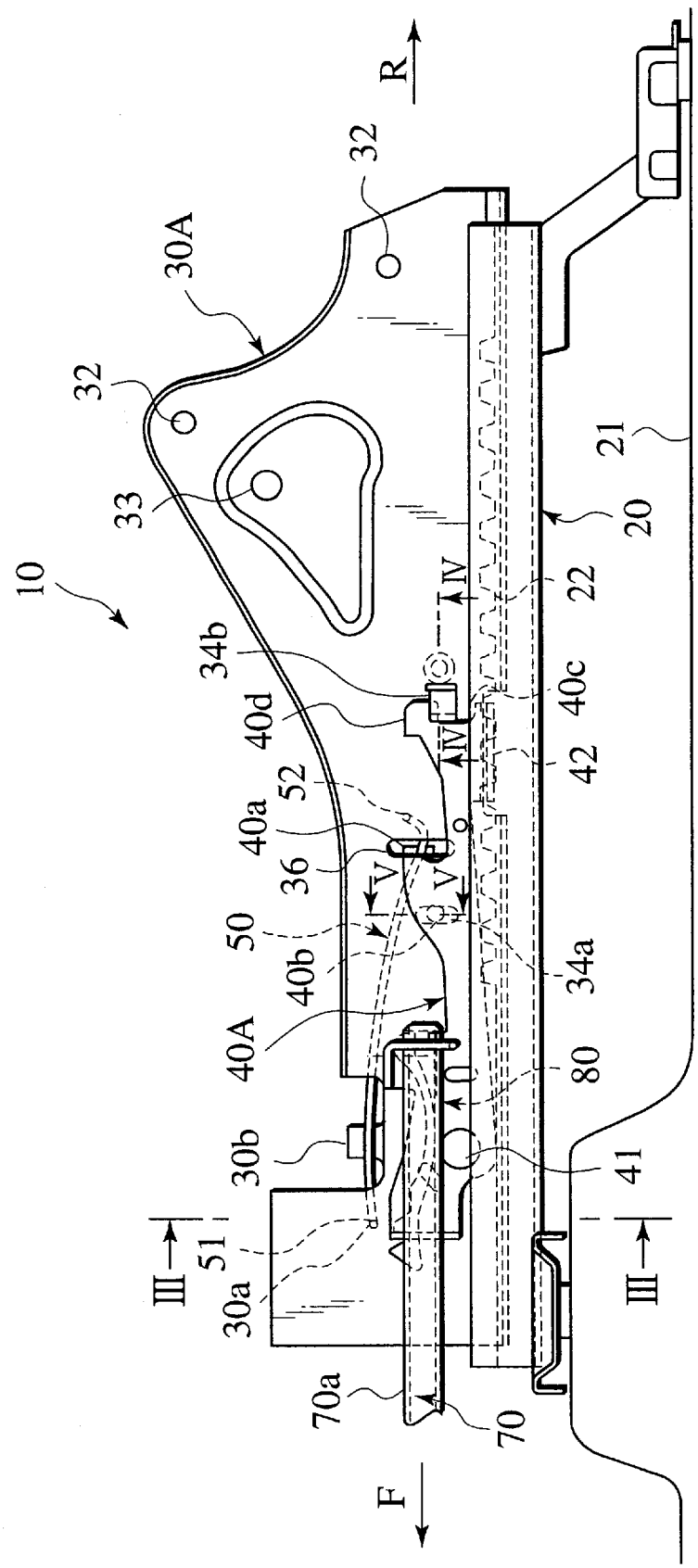
FIG. 2 is an explanatory front view of a belt anchor attachment side thereof.
Figure 3:
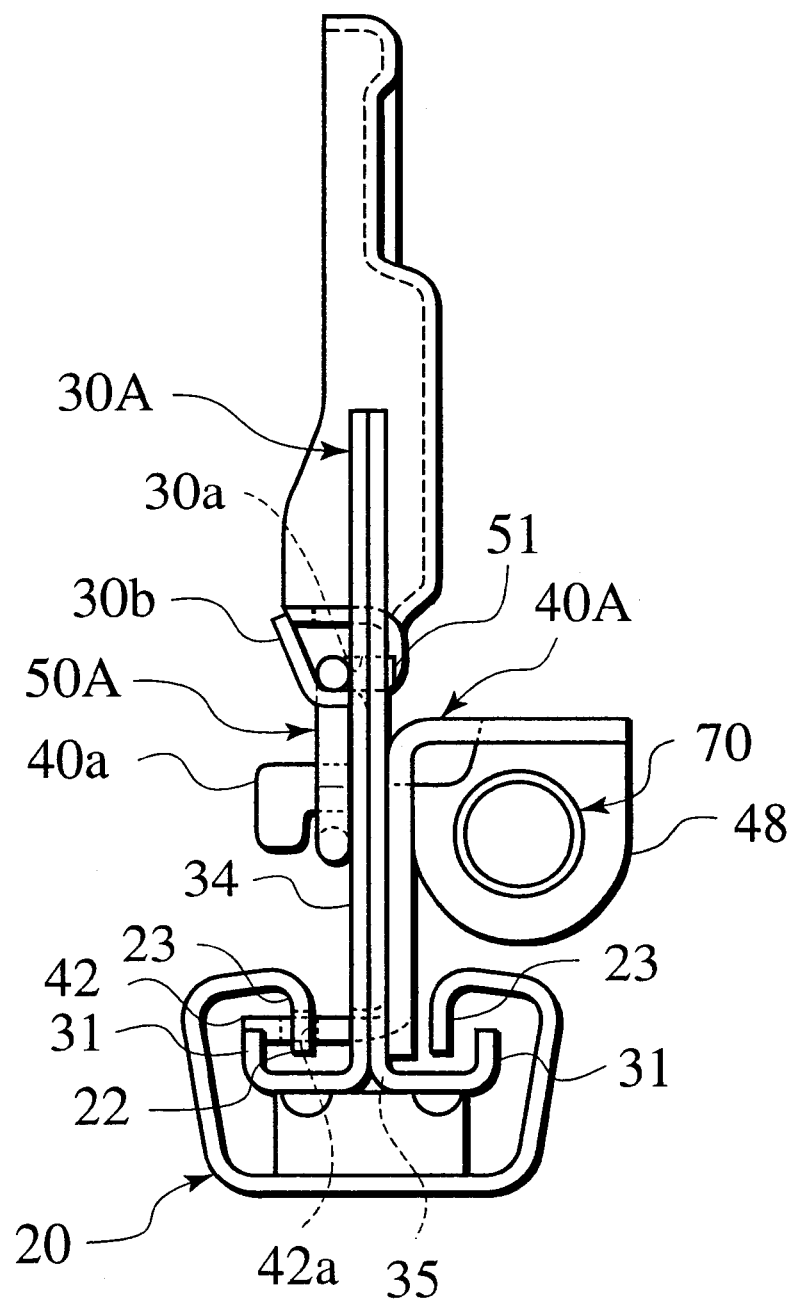
FIG. 3 is an explanatory sectional view taken along line III—III of FIG. 2.

Lower rails 20 are attached to the floor 21 of a vehicle body at predetermined intervals in transverse direction. As shown in FIG. 3, each of the lower rails 20, 20 is formed to have a generally U-shaped cross section and stopper portions 23, 23 folded inward are formed on the both sides of the rail 20, respectively. The upper rails 30A and 30B are movably supported by the lower rails 20, 20 in longitudinal direction, respectively. Each of the upper rails 30A and 30B is formed to have a generally T-shape in which generally L-shaped plates are put together and stopper portions 31, 31 are formed to be directed upward on the both sides of each of the upper rails 30A and 30B, respectively. The seat cushion 61-side seat main body 60 is put on the upper rails 30A and 30B, whereby the seat main body 60 can be moved longitudinally. Further, as shown in FIGS. 1 and 2, attachment holes 32 for attaching the seat reclining apparatus 63 are formed in the rear portions of the upper rails 30A and 30B, respectively. In this embodiment, a belt anchor is fixed to the attachment portion 33 of the upper rail 30A.

A plurality of lock teeth 22 are equidistantly formed at one of the stopper portions 23 of each of the lower rails 20, 20 in longitudinal direction. Portions of the lock plates 40A and 40B are rotatably, pivotally attached to the front portion of vertical walls 34 of the upper rails 30A and 30B by pivot shafts 41, respectively. Lock portions 42 having a plurality of or, for example, two lock holes 42a engageable with the lock teeth 22 of the lower rails 20, 20 are formed on the free end of the lock plates 40A and 40B, respectively. Each of the lock portions 42 protrudes in opposite direction to a notch 35 formed at the centrally lower portion of each of the upper rails 30A and 30B. The lock holes 42a of the lock portion 42 are engaged with the lock teeth 22.

Figure 5:
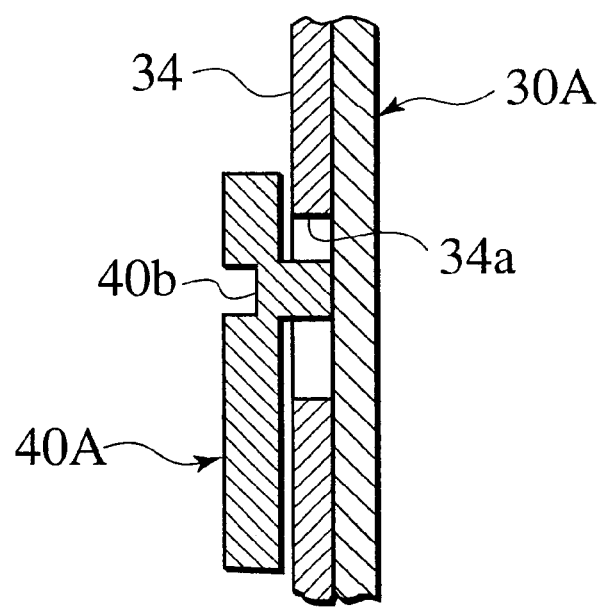
FIG. 5 is an explanatory sectional view taken along line V—V of FIG, 2.
Figure 6:
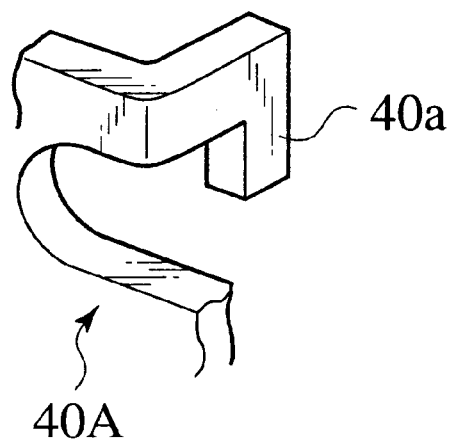
FIG. 6 is an explanatory perspective view of a lock spring stopper portion.

A lock spring stopper portion 40a inserted into a circular arc-shaped lock plate guiding long hole 36 and formed at each of the upper rails 30A and 30B about the pivot shaft 41 is formed to be bent at the free end side of each of the lock plates 40A and 40B as shown in FIG. 6 (which shows only a lock plate 40A side). In addition, an embossed protrusion 40b is formed at each of the lock plates 40A and 40B, and engaged with a groove 34a formed in one of the vertical wall portions 34 of each of the upper rails 30A and 30B, as shown in FIG. 5 (which shows only the lock plate 30A side).

The lock spring 50 is formed into rod shape. One end 51 of the lock spring 50 is inserted into a stopper hole 30a formed in each of the upper rails 30A and 30B and a portion of the end 51 is engaged with a hook 30b formed in each of the upper rails 30A and 30B, thereby preventing the rotation of the lock spring 50. In this state, a hook portion 52 formed at the other end of the lock spring 50 is stopped at the lock spring stopper 40a formed at each of the lock plates 40A and 40B. This lock spring 50 urges each of the lock plates 40A and 40B to rotate in locking direction (counterclockwise direction) about the pivot shaft 41. In other words, the lock holes 42a of the lock plates 40A and 40B are press-contacted and engaged with the lock teeth 22 of the lower rails 20, 20, respectively, thereby preventing the longitudinal movement of the upper rails 30A and 30B, i.e., the seat main body 60.

Figure 4:
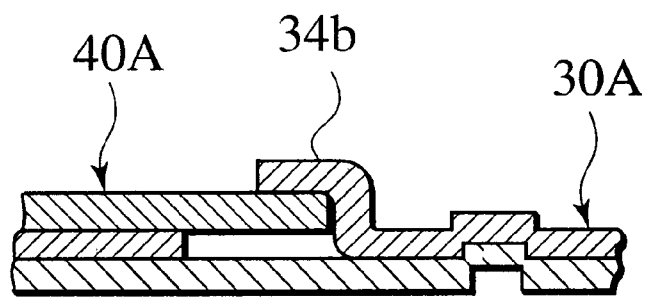
FIG. 4 is an explanatory sectional view taken along line IV—IV of FIG. 2.
Figure 7:
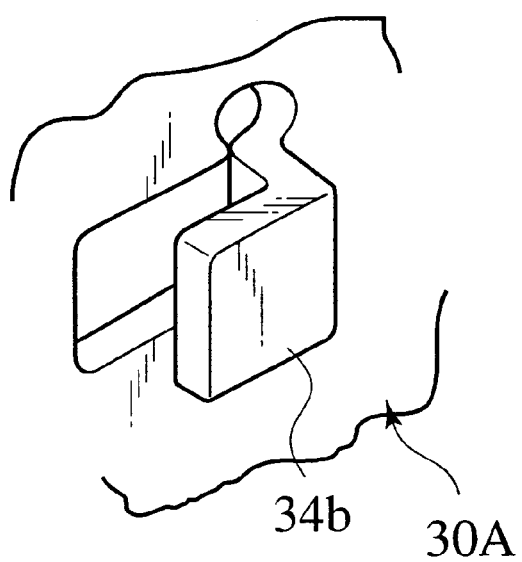
FIG. 7 is an explanatory perspective view of a lock plate holding bent portion.

A lock plate holding bent portion 34b serving as lock plate holding means is formed at a position of each of the upper plates 30A and 30B corresponding to the free end of each of the lock plates 40A and 40B by cutting and raising one of the vertical walls 34 of each of the upper rails 30A and 30B with the tip end thereof bent as shown in FIGS. 4 and 7 (which show only the upper rail 30A side), whereby the free end of each of the lock plates 40A and 40B is slidably held in the lock plate holding bent portion 34b.

Figure 8:
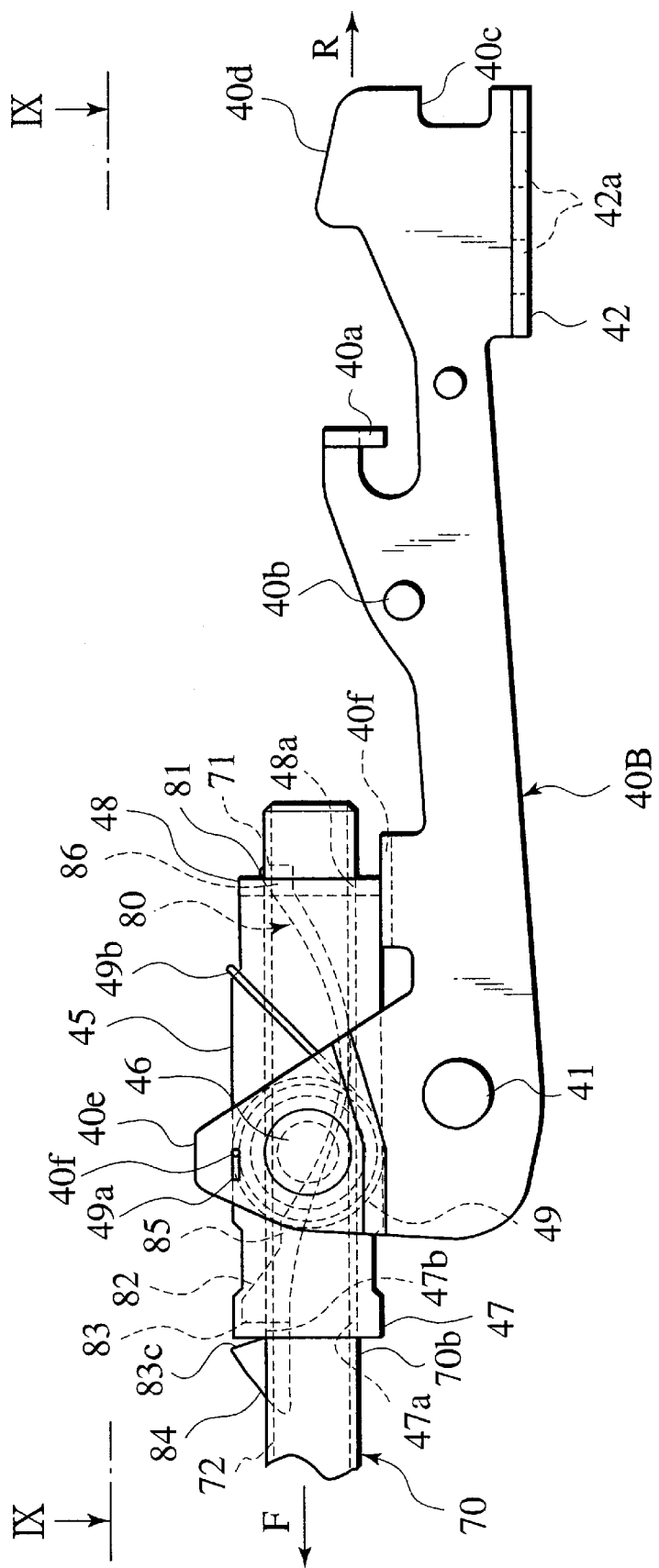
FIG. 8 is an explanatory front view showing a state in which an operation lever is attached to a lock plate at the belt anchor non-attachment side through a plate-like member.
Figure 9:
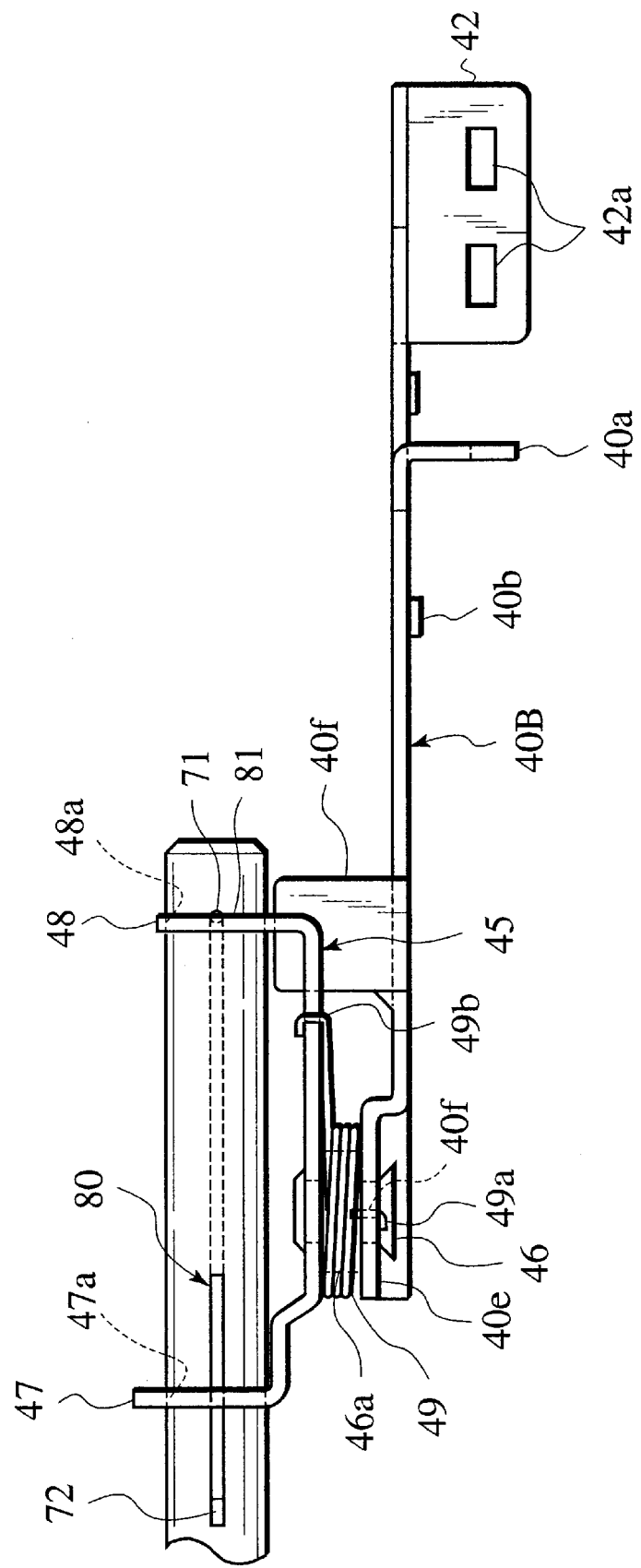
FIG. 9 is an explanatory sectional view taken along line IX—IX of FIG. 8.
Figure 10:
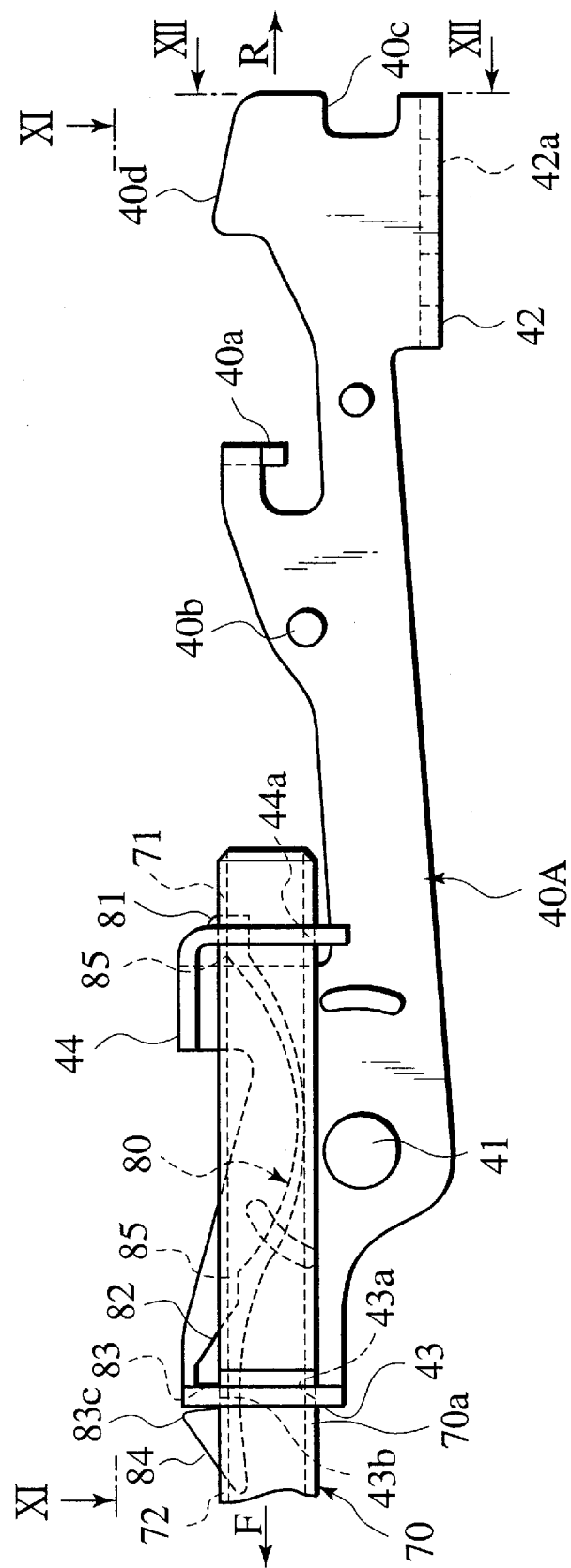
FIG. 10 is an explanatory front view showing a state in which the operation lever is attached to a lock plate at the belt anchor attachment side through a plate-like member.
Figure 11:
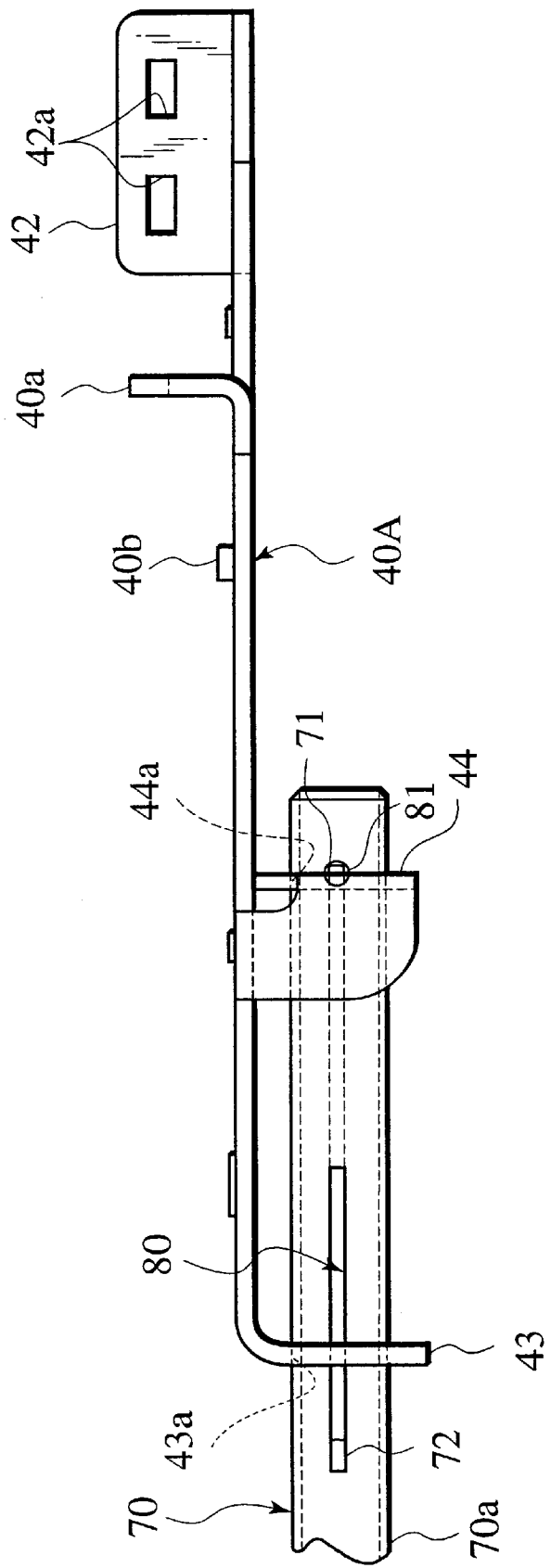
FIG. 11 is an explanatory sectional view taken along line XI—XI of FIG. 10.
Figure 12:
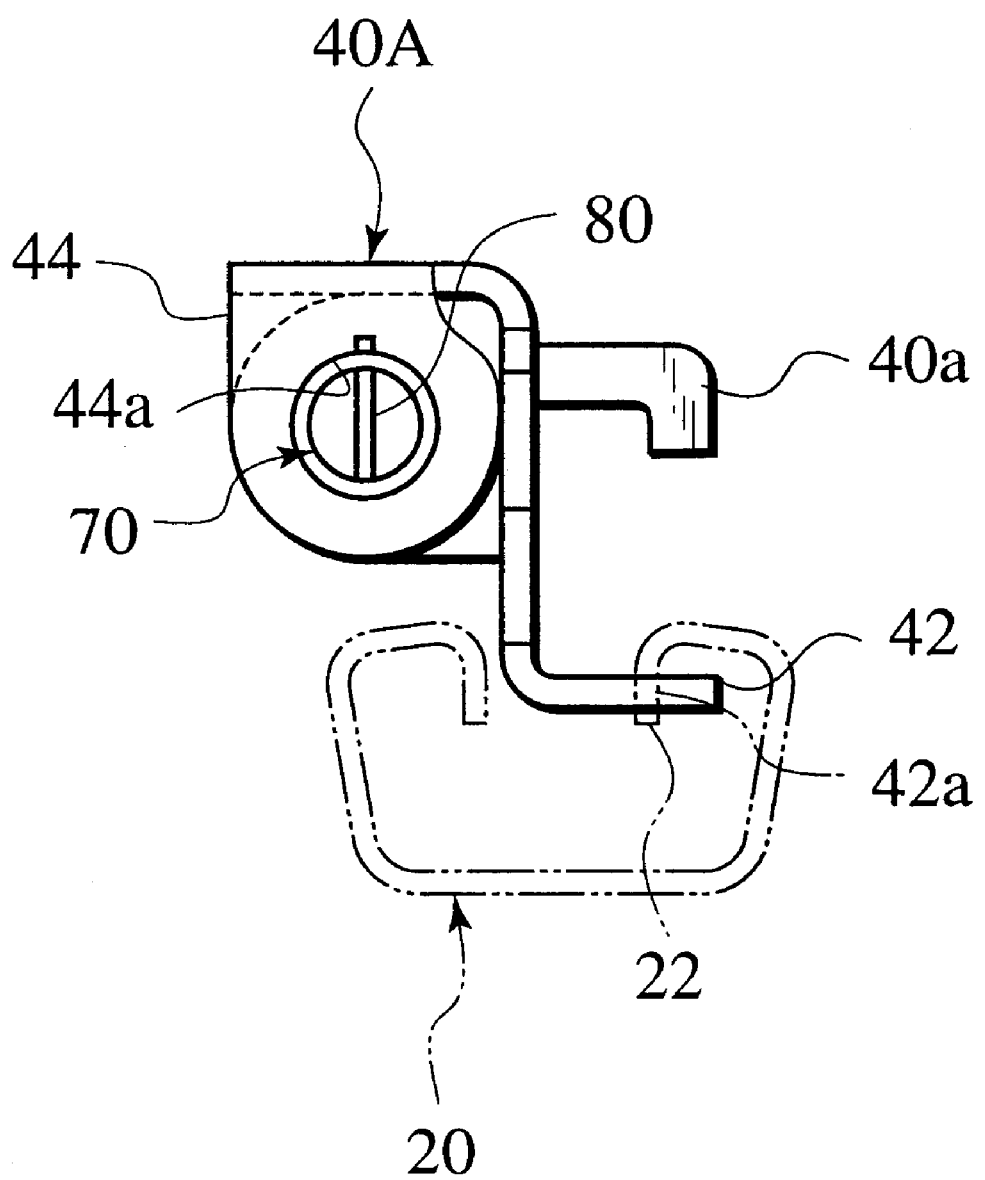
FIG. 12 is an explanatory sectional view taken along line XII—XII of FIG. 10.

Further, as shown in FIGS. 8 and 10, a notch 40c through which the lock plate holding bent portion 34b can pass, is formed at a position of the free end of each of the lock plates 40A and 40B which position corresponds to the lock plate holding bent portion 34b. By doing so, the lock plates 40A and 40B are attached to the upper rails 30A and 30B from lateral sides, respectively so that each notch 40c is adjusted to the lock plate holding bent portion 34b.

A guide protrusion 40d is formed on the upper portion of each of the lock plates 40A and 40B to be engaged with the lock plate holding bent portion 34b while the lock holes 42a of each of the lock plates 40A and 40B are press-contacted and engaged with the lock teeth 22 of the lower rail 20 and protrude above the bent portion 34b. With this guide protrusion 40d, even when each of the lock plates 40A and 40B rotate downward to the position at which the lock holes 42a of each of the lock plates 40A and 40B detach from the lock teeth 22, the free end of each of the lock plates 40A and 40B is set not to detach from the lock plate holding bent portion 34b.

Operation lever attachment portions 43 and 44 for attaching the belt anchor attachment side end portion 70a of the operation lever 70 are formed to be bent at predetermined intervals in a portion of the pivotal attachment portion 41 of the belt anchor attachment-side lock plate 40A for pivotally attaching the plate 40A to the upper rail 30A. Attachment holes 43a and 43b are formed in the operation lever attachment portions 43 and 44, respectively so as to be axially aligned with each other. The belt anchor attachment-side end portion 70a of the operation lever 70 is inserted into these attachment holes 43a and 44a. The edge portion of the attachment hole 43a of one operation lever attachment portion 43 forms a stopper portion 43b which can be fitted into a fixation concave portion 83 of a plate-like member 80 which will be described later.

A convex portion 40e protruding upward in a portion of the pivot shaft 41 which is the pivotal attachment portion attached to the upper rail 30B is formed at the lock plate 40B at the belt anchor non-attachment side. A plate-like operation lever attachment member 45 for attaching the belt anchor non-attachment-side end portion 70b of the operation lever 70 to this convex portion 40e is pivotally attached, so to be freely up and down, to a pivot shaft 46. A stepped portion 46a which contacts with the inner surface of the convex portion 40e and that of the operation member 45 is formed at the pivot shaft 46.

Operation lever attachment portions 47 and 48 are formed to be bent at positions of the operation lever attachment member 45 which position correspond to the operation lever attachment members 43 and 44 formed at lock plate 40A at the belt anchor attachment side, respectively. Attachment holes 47a and 48a are formed in the respective operation lever attachment portions 47 and 48 so as to be aligned with each other. The belt anchor non-attachment-side end portion 70b of the operation lever 70 is inserted into the attachment holes 47a and 48a. The edge portion of the attachment hole 47a of one operation lever attachment portion 47 forms a stopper portion 47b which can be fitted into the fixation concave portion 83 of the plate-like member 80.

Further, the base of a torsion coil spring 49 is wound around the stepped portion 46a of the pivot shaft 46. One end portion 49a of the torsion coil spring 49 is stopped at a stopper hole 40f formed in the convex portion 40e of the lock plate 40B, and a hook portion 49b formed on the other end thereof is stopped on a rear R side upper surface of the operation lever attachment member 45. The torsion coil spring 49 urges the operation lever attachment member 45 to rotate about the pivot shaft 46 in clockwise direction. One operation lever attachment portion 48 of the operation lever attachment member 45 is normally press-contacted and engaged with a flange portion 40f formed to be bent at the lock plate 40B.

Figure 14:
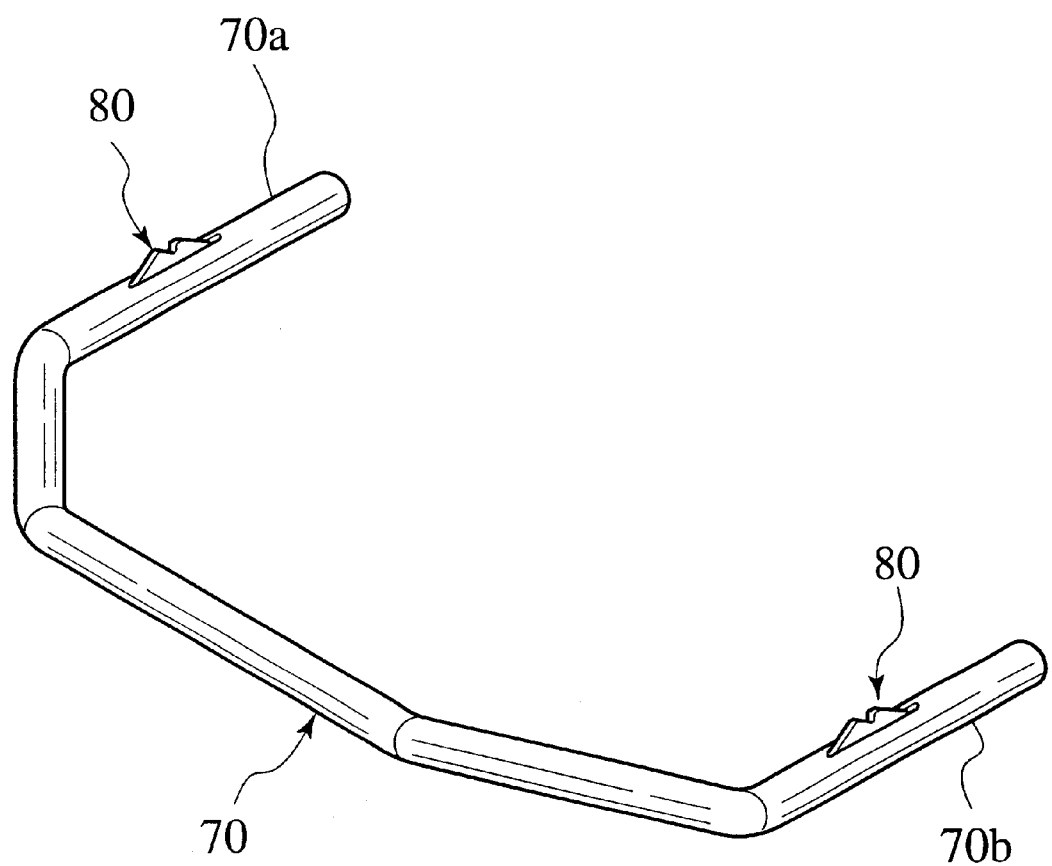
FIG. 14 is an explanatory perspective view of the operation lever to which the plate-like members are attached.
Figure 15:
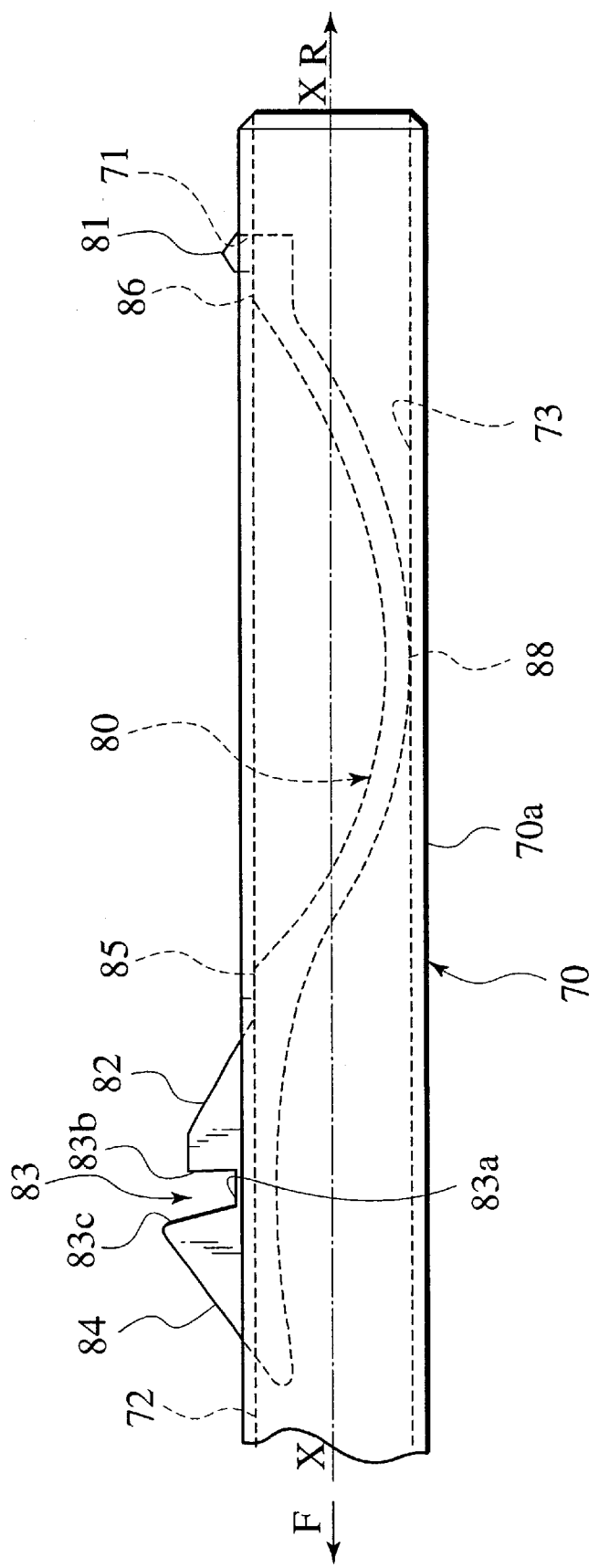
FIG. 15 is an explanatory front view showing a state in which the plate-like member is attached to the end portion of the operation lever.

As shown in FIG. 14, the operation lever 70 is made of pipe material and formed into U-shape. As shown in FIG. 15, a stopper hole 71 and a slit 72 extending toward the front F side on an axis passing the center of the stopper hole 71 with a predetermined distance from the stopper hole 71, are formed on the upper surface of each of the end portions 70a and 70b.

Figure 13:
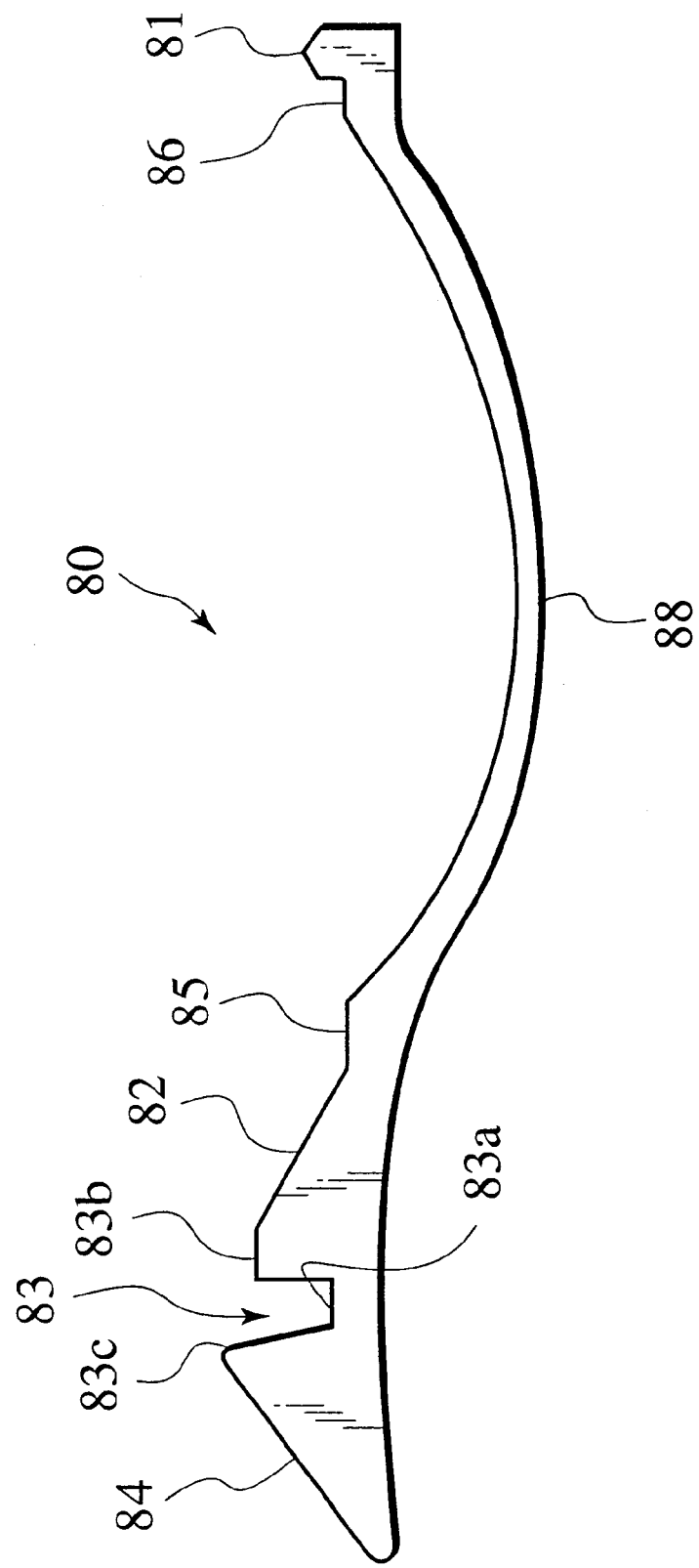
FIG. 13 is an explanatory front view of the plate-like member.

As shown in FIG. 13, the plate-like member 80 is made of a thin spring material and inserted into the operation lever 70 from the slit 72 of the operation lever 70. An engagement convex portion 81 set to be fitted into and stopped in the stopper hole 71 of the operation lever 70 is formed on one end portion at the side at which the member 80 is inserted.

An attachment taper portion 82, a fixation concave portion 83 and a return taper portion 84 are sequentially formed on the other end portion of the plate-like member 80 from the direction in which the plate-like member 80 is inserted into the attachment hole 43a. They are set to protrude outward from the slit 72 when the plate-like member 80 is attached to the operation lever 70 as shown in FIG. 15.

The attachment taper portion 82 is an inclined surface which is directed downward toward the rear R side and, as shown in FIG. 15, inclined toward the axial line X—X of the operation lever 70 when the plate-like member 80 is attached to each of the end portions 70a and 70b of the operation lever 70. During assembly, when the operation lever 70 is inserted into the attachment hole 43a of the lock plate 40A and the attachment hole 47a of the lock plate 40B-side operation lever attachment portion 45, the attachment taper portion 82 abuts on the edges of the attachment holes 43a and 47a and bent so as not to prevent the insertion of the operation lever 70 into the attachment holes 43a and 47a.

The fixation concave portion 83 is formed to be able to be fitted into the stopper portion 43b of the lock plate 40a and the stopper portion 47b of the operation lever attachment member 45. By setting the base 83a of the fixation concave portion 83 to protrude outward of the slit 72, a spring force is applied to the stopper portions 43b and 47b to cause the end portions 70a and 70b of the operation lever 70 to be drawn to one sides of the attachment holes 43a and 47a, respectively.

The side surface 83b of the fixation concave portion 83 at the attachment taper portion 82 side is formed to be almost orthogonal to the axial line X—X of the operation lever 70 when the plate-like member 80 is attached to each of the end portions 70a and 70b of the operation lever 70 to make it difficult to detach the operation lever 70 when the lever 70 is pulled in pulling direction. Also, a detachment taper portion inclined to be wider in opening direction is formed on the other side surface 83c of the fixation concave portion 83. When a strong force in pushing direction acts on the operation lever 70, the stopper portion 43b of the lock plate 40A and the stopper portion 47b of the operation lever attachment member 45 detach from the fixation concave portion 83 and the operation lever 70 is depressed to thereby allow moving toward the rear R side.

Further, a return taper portion 84 inclined downward is formed opposite to the attachment taper portion 82 through the fixation concave portion 83. Even when the operation lever 70 is erroneously depressed, the plate-like member 80 is bent by pulling out the operation lever 70 and the fixation concave portion 83 can be engaged again with the stopper portion 43b of the lock plate 40A and the stopper portion 47b of the operation lever attachment member 45.

When the operation lever 70 is attached to the normal position of the operation lever attachment members 45 of the lock plate 40A and the lock plate 40B, that is, when the stopper portion 43b of the lock plate 40A and the stopper portion 47b of the operation attachment member 45 are fitted in the fixation concave portion 83 of the plate-like member 80, the stopper hole 71 of the operation lever 70 overlaps the operation lever attachment portion 44 of the lock plate 40A and the operation lever attachment portion 48 of the operation lever attachment member 45, and the engagement convex portions 81 of the plate-like members 80 protruding from the stopper hole 71 abut on the inner surface of the attachment hole 44a of the lock plate 40A and that of the attachment hole 48a of the operation lever attachment member 45, respectively, and spring forces are applied thereto. Thus, the operation lever 70 is drawn to the one sides of the attachment holes 44a and 48a. While this engagement convex portion 81 is formed into angle shape in this embodiment, it may be formed into a circular arc shape or a taper shape.

Next, the function of the embodiment according to the present invention will be described.

When the lock plates 40A and 40B are attached to the upper rails 30A and 30B, respectively, the notches 40c of the lock plates 40A and 40B are inserted into the lock plate holding bent portions 34b and the lock spring stopper portions 40a are inserted into the lock plate guiding long holes 36, respectively. At this moment, the lock portions 42 of the lock plates 40A and 40B protrude toward the opposite side to the notches 35 of the upper rail 30A and 30B, respectively. Next, the bases of the lock plates 40A and 40B are made pivotally supported to the upper rails 30A and 30B by the pivot shafts 41, respectively. By doing so, it is possible to rotatably, pivotally attach the lock plates 40A and 40B to the upper rails 30A and 30B, respectively.

Next, the upper rails 30A and 30B are slidably attached to the lower rails 20, 20 through rollers, balls or the like, whereby even when the lock holes 42a of the lock plates 40A and 40B rotate to the positions at which the lock holes 42a are engaged with the lock teeth 22 of the lower rails 20, 20, the notches 40c do not rotate to the positions at which the notches 40c meet the lock plate guiding bent portions 34b, respectively.

While the lock springs 50 having one ends 51 inserted into the stopper holes 30a of the upper rails 30A and 30B and the neighborhoods of the ends 51 stopped at the hook portions 30b is bent, the hook portions 52 on the other ends of the lock springs 50 are stopped at the lock spring stopper portions 40a of the lock plates 40A and 40B which portions protrude from the lock plate guiding long holes 36 of the upper rails 30A and 30B, respectively. By doing so, the lock portions 42 of the lock plates 40A and 40B are urged in the counterclockwise direction in the drawings, i.e., in the direction in which the lock holes 42a of the lock plates 40A and 40B are press-contacted and engaged with the lock teeth 22 of the lower rails 20, 20, respectively.

To attach the operation lever 70 to the lock plates 40A and 40B, as shown in FIG. 15, the plate-like members 80 are bent and inserted into the operation lever 70 from the slits 72, the engagement convex portions 81 are fitted into the stopper holes 71 of the operation lever 70 from inside and flat portions 85 are press-contacted with the inner surface 73 of the operation levers 70, respectively. At this moment, the arc portions 88 of the plate-like members 80 are press-contacted with the inner surface 73 of the operation lever 70.

Figure 18:
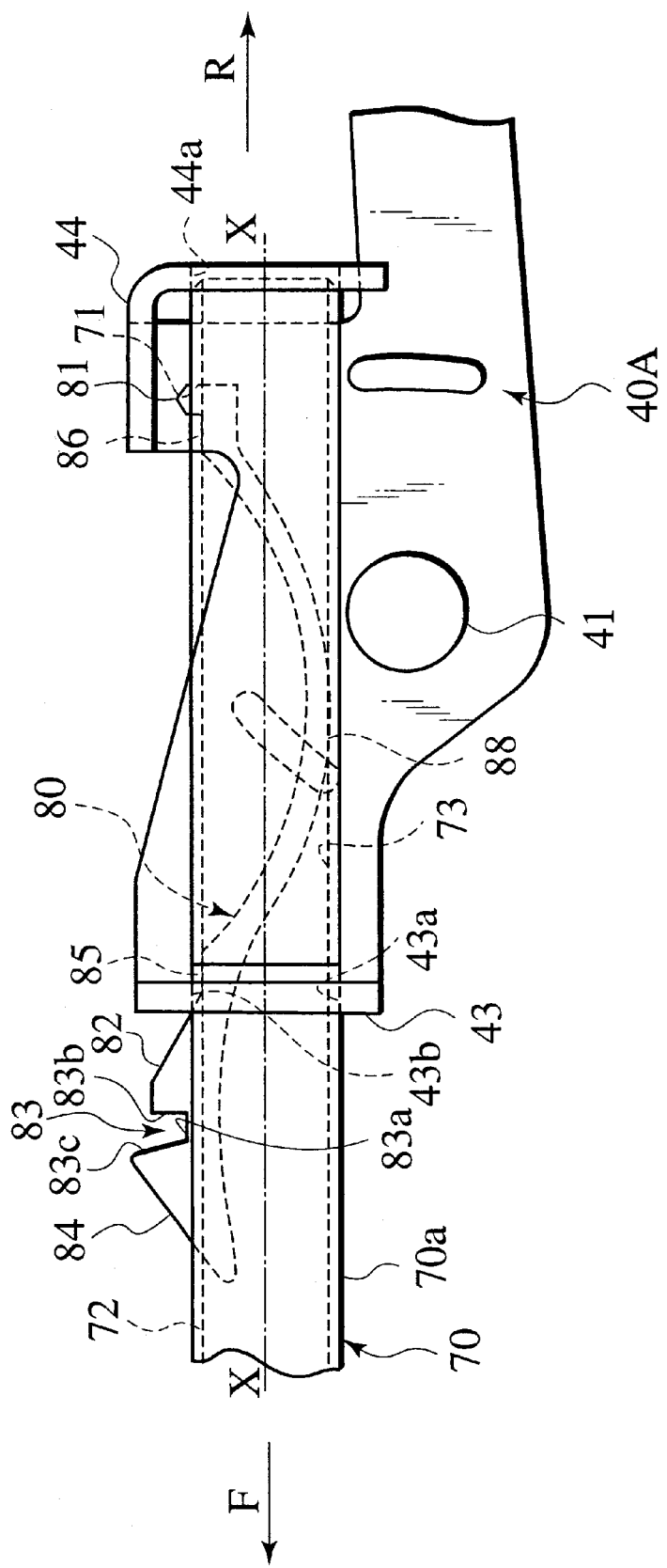
FIG. 18 is an explanatory view of the operation of the plate-like member.

Next, as shown in FIG. 18, the end portion 70a of the operation lever 70 to which the plate like member 80 is attached is inserted into the attachment hole 43a of the operation lever attachment portion 43 of the lock plate 40A. Then, the stopper portion 43b of the lock plate 40A slides on the attachment taper portion 82 and the front F side of the plate-like member 80 is bent with the contact portion at which the art portion 88 contacts with the inner surface 73 used as a fulcrum, whereby the plate-like member 80 is temporarily brought into the slit 72. When the fixation concave portion 83 reaches a position at which the portion 83 faces the stopper portion 43b, the portion 83 is fitted into the stopper portion 43b by the spring force of the plate-like member 80. Thus, as shown in FIG. 10, the end portion 70a of the operation lever 70 can be attached to the lock plate 40A.

This attachment method is also applicable to a case of attaching the end portion 70b of the operation lever 70 to which the plate-like member 80 is attached, to the operation lever attachment portion 45 of the lock plate 40B, which description will not be given herein.

As can be seen, the operation lever 70 attached to the lock plates 40A and 40B is rotated upward, whereby the lock plates 40A and 40B rotate about the pivot shafts 41 in clockwise direction, the lock holes 42a detach from the lock teeth 22 of the lower rails 20, 20, respectively, and the seat main body 60 can be, therefore, moved in longitudinal direction.

Here, when a force of a certain level or higher is applied to the operation lever 70 from the front F side, then the stopper portion 43b of the lock plate 40A and the stopper portion 47b of the operation lever attachment member 45 slide on the detachment taper portion 83c, the front F sides of the plate-like members 70 are brought into the slits 72 and the operation lever 70 moves toward the rear R side.

Figure 19:
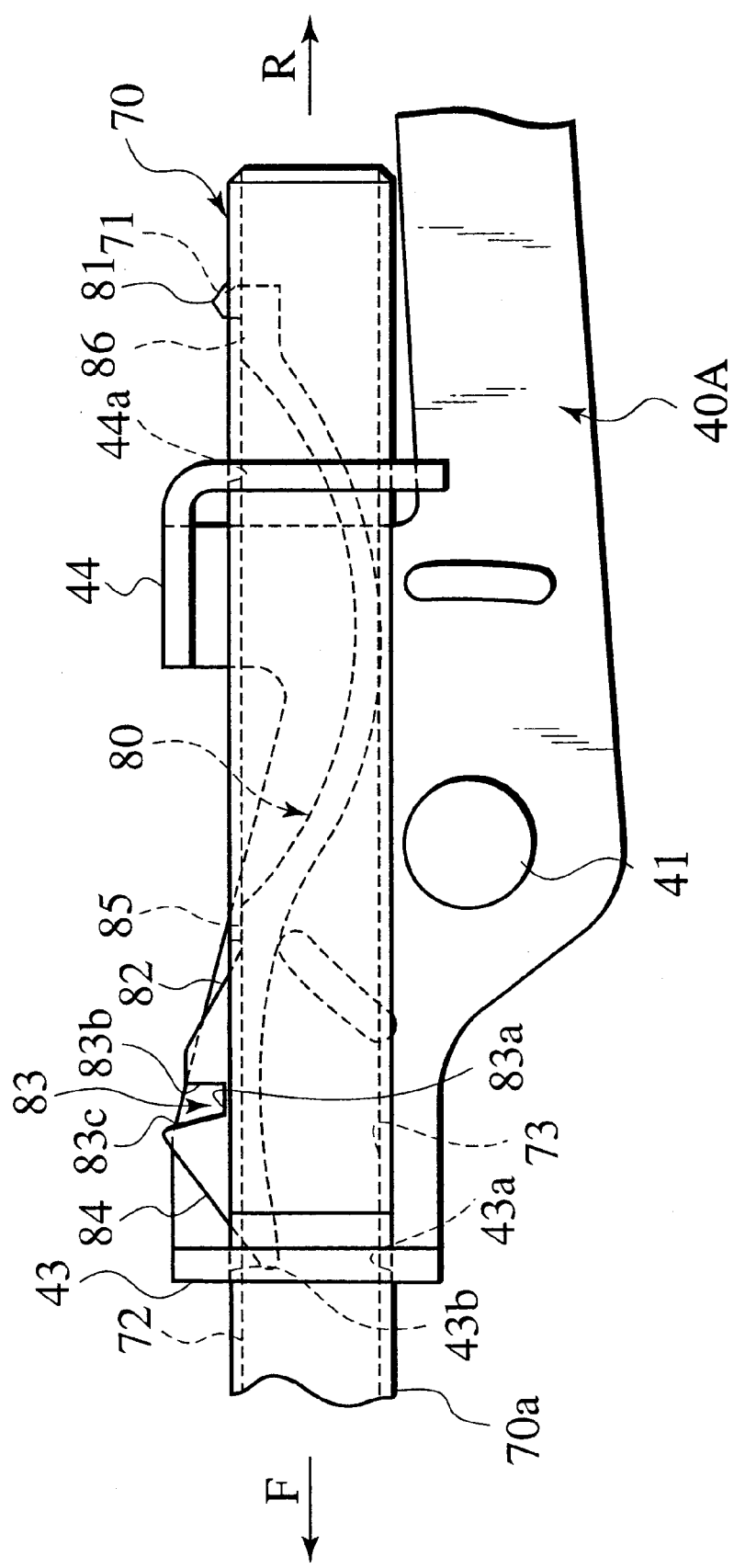
FIG. 19 is an explanatory view of the operation of the plate-like member.

Then, when an abnormal force is applied from the front F side to the operation lever 70 and the operation lever 70 goes beyond the normal attachment position and enters the lock plate 40A and the operation lever attachment member 45 as shown in FIG. 19 (which shows only the lock plate 40A side), the operation lever 70 is pulled back and moved to the front F side. Then, the stopper portion 43b of the lock plate 40A and the stopper portion 47b of the operation lever attachment member 45 slide on the return taper portion 84 and the front F side of the plate-like members 80 are temporarily brought into the slits 72, respectively. When the fixation concave portions 83 reach positions at which the portions 83 face the stopper portions 43b and 47b, respectively, the spring forces of the plate-like member 80 cause the fixation convex portions 83 to be fitted into the stopper portions 43b and 47b, respectively. As a result, the operation lever 70 can be returned to the normal attachment position.

Further, when abnormality such as a collision occurs, a stress acts on the upper rail 30A at the belt anchor attachment side and the upper rail 30A is thereby pulled upward together with the lock plate 40A. At this moment, the belt anchor attachment-side end portion 70a of the operation lever 70 also moves upward.

Figure 20:
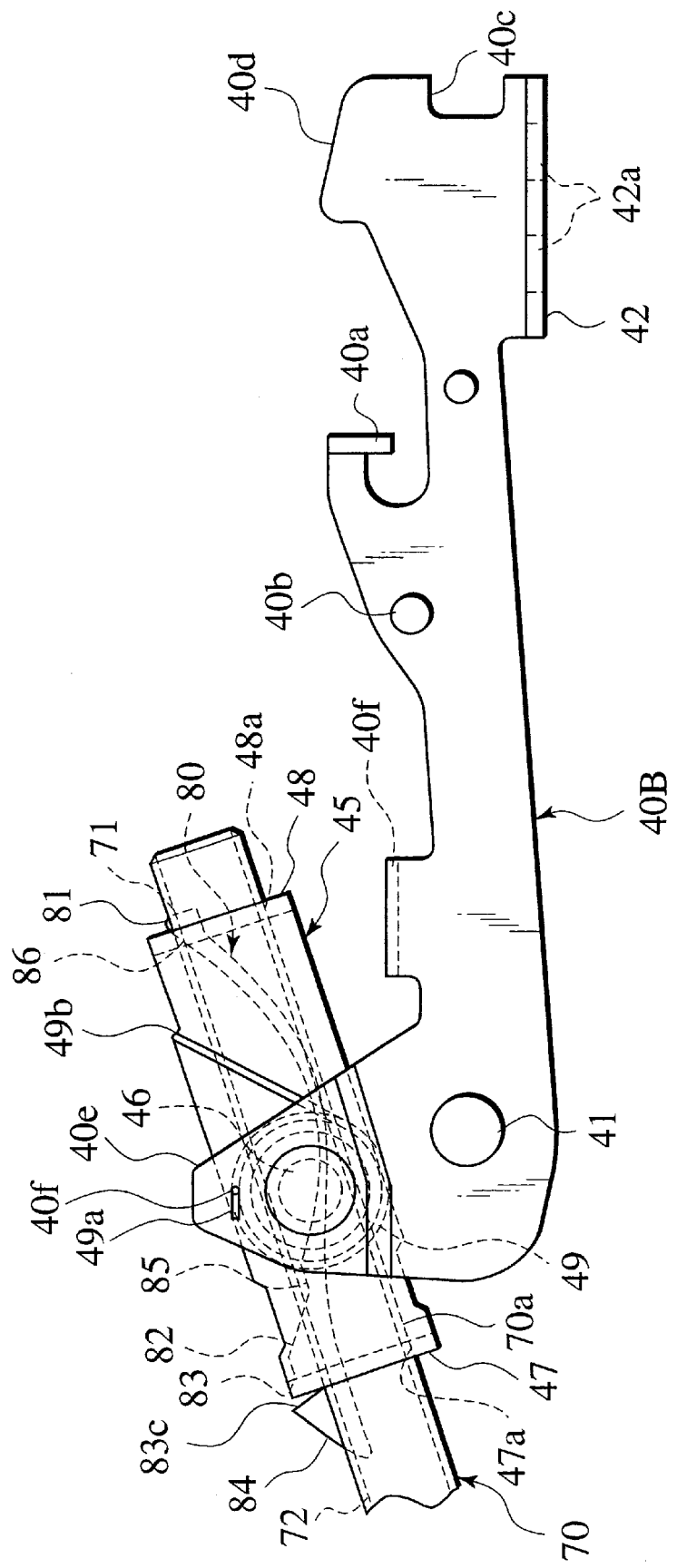
FIG. 20 is an explanatory view of the operation of the operation lever attachment member.

Then, as shown in FIG. 20, the operation lever attachment member 45 of the lock plate 40B to which the end portion 70b of the operation lever 70 is attached, rotates about the pivot shaft 46 in counterclockwise direction against the spring force of the torsion coil spring 49, whereby the engagement of one operation lever attachment portion 48 of the operation lever attachment member 45 with the flange portion 40f of the lock plate 40B is released.

As can be seen, the end portion 70b of the operation lever 70 attached to the lock plate 40B arranged at the upper rail 30B at the belt anchor non-attachment side can be moved following the end portion 70a of the operation lever 70 by pivotally attaching the operation lever attachment member 45 to the lock plate 40B so as to be freely up and down by the pivot shaft 46. As a result, even when a stress acts on the upper rail 30A at the belt anchor attachment side due to a collision or the like, this stress does not transmitted to the lock plate 40B at the belt anchor non-attachment side. The lock plate 40A at the belt anchor attachment side and the operation lever 70 can be, therefore, moved following the deformation of the upper rail 30A at the belt anchor attachment side.

As a result, the operation lever 70 is not twisted. Thus, after the collision, when no force acts on the front F direction, the rotation of the lock plate 40A at the belt anchor attachment side in unlock direction is prevented and the engagement of the lock holes 42a of the lock plate 40A with the lock teeth 22 of the lower rail 20 can be thereby maintained.

As stated so far, according to the embodiment of the present invention, when an abnormal stress acts on the upper rail 30A at the belt anchor attachment side due to a collision or the like, the end portion 70b of the operation lever 70 attached to the lock plate 40B arranged at the upper rail 30B at the belt anchor non-attachment side is rotatably attached to the lock plate 40B at the belt anchor non-attachment side through the operation lever attachment members 45 and can be moved following the end portion 70a of the operation lever 70 attached to the lock plate 40A arranged at the upper rail 30A at the belt anchor attachment side. Due to this, the stress acting on the upper rail 30A at the belt anchor attachment side is not transmitted to the lock plate 40B at the opposite side to the belt anchor attachment side and the operation lever 70 is not twisted. This can prevent releasing the locking state of the belt anchor side.

Furthermore, one operation lever attachment portion 48 of the operation lever attachment member 45 is normally press-contacted and engaged with the flange portion 40f of the lock plate 40B at the belt anchor non-attachment side by the torsion coil spring 49. Thus, the operation of the operation lever 70 allows the lock plate 40A at the belt anchor attachment side and the lock plate 40B at the belt anchor non-attachment side to rotate simultaneously.

Moreover, since the pivot shaft 46 of the operation lever attachment member 45 is provided at the lock plate 40B, it is possible to eliminate the loss of operational force even when an additional member is provided between the operation lever 70 and the lock plate 40B.

The entire contents of Japanese Patent Application P11-130379 (filed May 11, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A seat sliding apparatus, comprising:
   a pair of right and left lower rails (20, 20) each having lock teeth (22, 22) formed thereon;
   a first and a second upper rails (30A, 30B) being arranged as a pair of right and left upper rails, the first and second upper rails (30A, 30B) being slidably mounted to the pair of right and left lower rails (20, 20) respectively, the first upper rail (30A) positioned at a seat belt anchorage plate attachment side, the second upper rail (30B) positioned opposite to the seat belt anchorage plate attachment side;
   first and second lock plates (40A, 40B) wherein portions of bases of the lock plates (40A, 40B) rotatably provided on side surfaces of the first and second upper rails (30A, 30B) by pivot portions (41, 41) respectively, lock holes (42a, 42a) engaged with the lock teeth (22, 22) formed on the pair of right and left lower rails (20, 20) being formed on free ends of the first and second lock plates (40A, 40B), respectively;
   lock springs (50, 50) provided at the first and second upper rails (30A, 30B) respectively, urging forces of the lock spring (50, 50) causing the lock holes (42a, 42*a*) to be engaged with the lock teeth (22, 22) respectively, the engagement of the lock holes with the lock teeth preventing a longitudinal movement of a seat main body (60) to be provided on the first and second upper rails (30A, 30B); and an operation lever (70) attached to the first and second lock plates (40A, 40B), the first and second lock plates (40A, 40B) simultaneously rotated and the engagement of the lock holes (42*a*, 42*a*) with the lock teeth (22, 22) released by operating the operation lever (70), the release of the engagement permitting the longitudinal movement of the seat main body (60), wherein the first end portion (70*a*) of the operation lever (70) is attached to a portion of the pivot portion (41) of the first lock plate (40A); and an operation lever attachment member (45) for attaching a second end portion (70*b*) of the operation lever (70) to a portion of the pivot portion (41) of the second lock plate (40B) is provided to be rotatable and freely up and down.

2. A seat sliding apparatus according to claim 1, wherein the operation lever attachment member (45) is urged in the same direction as a direction in which the second lock plate (40B) rotates so as to release the engagement of the lock holes (42*a*, 42*a*) with the lock teeth (22, 22); and by being urged, the operation lever attachment member (45) to abut on the second lock plate (40B).

3. A seat sliding apparatus according to claim 1, wherein the operation lever (70) is formed into U-shape.

* * * * *